US008812890B2

United States Patent
Brown et al.

(10) Patent No.: US 8,812,890 B2
(45) Date of Patent: *Aug. 19, 2014

(54) CONTROLLING POWER SEQUENCE IN A BLADE CENTER ENVIRONMENT

(75) Inventors: Deanna L. Q. Brown, Queen Creek, AZ (US); Jason J. Graves, Tucson, AZ (US); Kevan D. Holdaway, Hillsborough, NC (US); Nhu T. Nguyen, Tucson, AZ (US); Ronald I. Olguin, II, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 211 days.

This patent is subject to a terminal disclaimer.

(21) Appl. No.: 13/415,666

(22) Filed: Mar. 8, 2012

(65) Prior Publication Data

US 2012/0198261 A1 Aug. 2, 2012

Related U.S. Application Data

(63) Continuation of application No. 12/033,793, filed on Feb. 19, 2008, now Pat. No. 8,161,309.

(51) Int. Cl.
*G06F 1/00* (2006.01)
*G06F 11/30* (2006.01)

(52) U.S. Cl.
USPC .......................................... 713/330; 713/340

(58) Field of Classification Search
CPC ........................ G06F 1/3203; G06F 11/1417
USPC ................................................. 713/300, 330

See application file for complete search history.

(56) References Cited

U.S. PATENT DOCUMENTS

| 5,949,974 | A | 9/1999 | Ewing et al. |
|---|---|---|---|
| 6,661,671 | B1 | 12/2003 | Franke et al. |
| 6,718,472 | B1 | 4/2004 | Garnett |
| 7,010,589 | B2 | 3/2006 | Ewing et al. |
| 7,131,019 | B2 | 10/2006 | Lee |
| 7,171,571 | B2 | 1/2007 | Starr et al. |
| 7,191,347 | B2 | 3/2007 | Bigelow et al. |
| 2003/0226004 | A1 | 12/2003 | Abbondanzio et al. |
| 2005/0273633 | A1 | 12/2005 | Wilcox et al. |
| 2005/0283624 | A1 | 12/2005 | Kumar et al. |
| 2006/0053320 | A1 | 3/2006 | Lin |
| 2008/0201595 | A1 | 8/2008 | Kawasaki |

*Primary Examiner* — Kim Huynh
*Assistant Examiner* — Brandon Kinsey
(74) *Attorney, Agent, or Firm* — Kunzler Law Group

(57) ABSTRACT

For controlling power sequence in a blade center environment, a relationship component module creates a topology of interdependent relationships of devices in the blade center environment. The devices include server blades, storage blades, and switch modules. A sequence module defines a sequence of the devices in the blade center environment to power off and on based on the topology of interdependent relationships. The sequence includes an order of a first independent blade server, each dependent storage blade of the first independent blade server, and a second independent blade server. A monitor component module monitors a command from an Advanced Management Module (AMM) to regulate power for the devices in the blade center environment. The AMM regulates power within the blade center. A validation module validates that the command does not violate the interdependent relationships and the sequence of devices or else blocks the command if the command is not validated.

12 Claims, 9 Drawing Sheets

CONTROLLING POWER SEQUENCE IN A BLADE CENTER ENVIRONMENT

CROSS-REFERENCE TO RELATED APPLICATIONS

This is a continuation application of and claims priority to U.S. patent application Ser. No. 12/033,793 entitled "APPARATUS, SYSTEM, AND METHOD FOR CONTROLLING POWER SEQUENCE IN A BLADE CENTER ENVIRONMENT" and filed on Feb. 19, 2008 for Deanna Lynn Quigg Brown et al, which is incorporated herein by reference.

BACKGROUND

1. Field

This invention relates to a blade center environment and more particularly relates to controlling power sequence in a blade center environment.

2. Description of the Related Art

Power available to a blade center environment typically has defined limits. For example, a blade center environment may allow consumption of thirty kilowatts (30 kw). Each component device in the blade center environment consumes power. Thus if all devices in the system consume power simultaneously, the power requirement may exceed the power available.

Operational functions and data are often stored on separate devices in a blade center environment. For example, software that retrieves a particular datum may be on a separate device from the originating command.

Each device in a blade center has a quantity of power required to perform operations. If the devices required to perform the operations exceed the available power, device are shut off.

Unfortunately, the devices may be shut-off without respect to the vital resources required to meet the operating requirements of the blade center. Thus a device that has vital resources for operating a system may be shut off, halting a vital process.

SUMMARY

A method to control power sequencing in a blade center environment is disclosed. A relationship component module creates a topology of interdependent relationships of devices in the blade center environment. The devices include server blades, storage blades, and switch modules. A sequence module defines a sequence of the devices in the blade center environment to power off and on based on the topology of interdependent relationships. The sequence includes an order of a first independent blade server, each dependent storage blade of the first independent blade server, and a second independent blade server. A monitor component module monitors a command from an Advanced Management Module (AMM) to regulate power for the devices in the blade center environment. The AMM regulates power within the blade center. A validation module validates that the command does not violate the interdependent relationships and the sequence of devices or else blocks the command if the command is not validated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, configuration selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
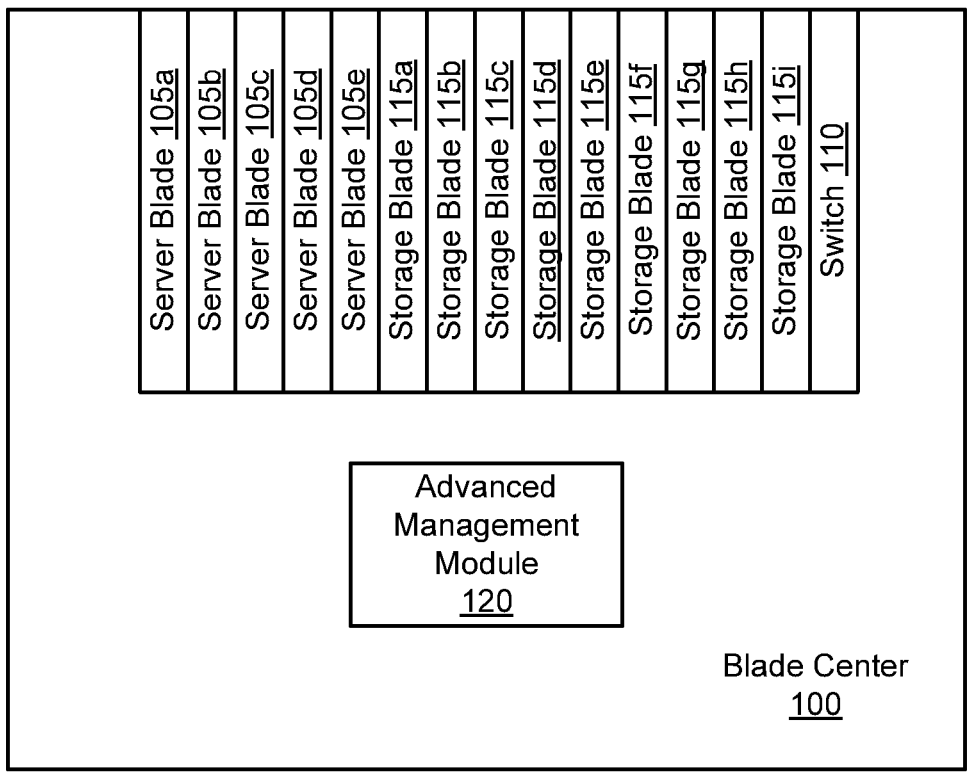
FIG. 1 is a schematic block diagram illustrating one embodiment of a blade center environment in accordance with the present invention.

FIG. 1 depicts schematic block diagram illustrating one embodiment of a blade center environment 100 in accordance with the present invention. The blade center environment 100 includes a plurality of server blades 105, a switch module 110, a plurality of storage blades 115 and an AMM 120.

Although for simplicity, five server blades 105, one switch module 110, nine storage blades 115, and one AMM 120 are shown, any number of plurality of server blades 105, switch modules 110, plurality of storage blades 115, and AMMs 120 may be employed.

The plurality of server blades 105 may be initially installed, configured, and tested to act as self-contained computer servers, designed for high density. The switch module 110 may be installed as a component of a powered device such as an enclosure that provides network routing services. The plurality of storage blades 115 may be initially installed, configured, and tested to act as a component of a powered device that provides data storage services.

The AMM 120 may be initially installed and configured to monitor and manage operational functions of server blades 105 and storage blades 115. For example, the AMM 120 may monitor the combined power consumed by the server blades 105 and storage blades 115. It is important to have information on the operational functions of the blade center environment 100 to properly manage the devices. Should power to the blade center environment exceed predefined limits, blades that are not required during certain operations can be powered off without impacting the functionality of the environment. In an embodiment, the interdependent relationships of the blade center environment are defined by Vital Product Data (VPD).

Figure 2:
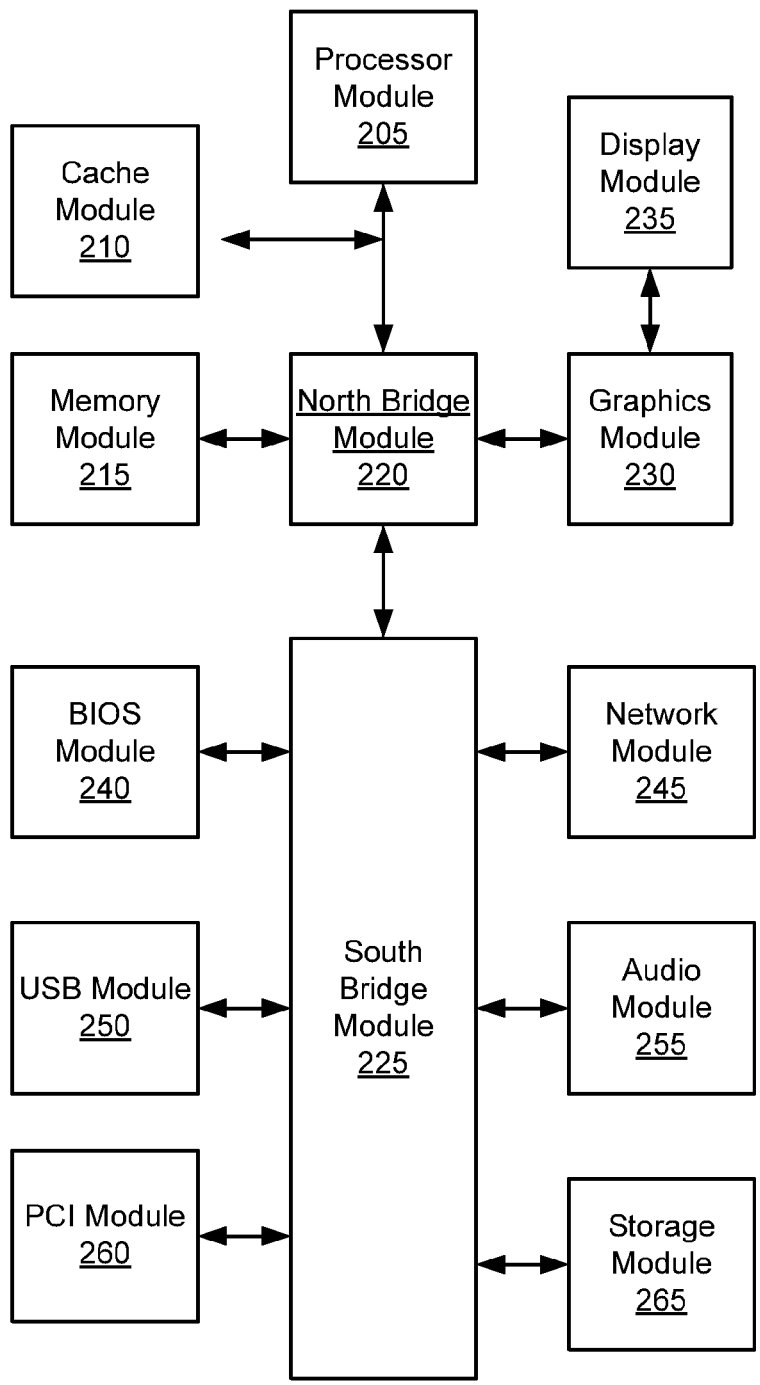
FIG. 2 is a schematic block diagram illustrating one embodiment of a computer of the present invention.

FIG. 2 depicts a schematic block diagram illustrating one embodiment of a computer 200 in accordance with the present invention. The computer 200 may be the server blade 105 and/or AMM 120 of FIG. 1. The computer 200 has a processor module 205, a cache module 210, a memory module 215, a north bridge module 220, a south bridge module 225, a graphics module 230, a display module 235, a BIOS module 240, a network module 245, a USB module 250, an audio module 255, a PCI module 260, and a storage module 265.

Although for simplicity, one processor module 205, one cache module 210, one memory module 215, one north bridge module 220, one south bridge module 225, one graphics module 230, one display module 235, one BIOS module 240, one network module 245, one USB module 250, one audio module 255, one PCI module 260, one storage module 265 are shown, any number of processor modules 205, cache modules 210, memory modules 215, north bridge modules 220, south bridge modules 225, graphics modules 230, display modules 235, BIOS modules 240, network modules 245, USB modules 250, audio modules 255, PCI modules 260, storage modules 265 may be employed.

The processor module 205, cache module 210, memory module 215, north bridge module 220, south bridge module 225, graphics module 230, display module 235, BIOS module 240, network module 245, USB module 250, audio module 255, PCI module 260, and storage module 265, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory module 215 stores software instructions and data comprising computer program products. The processor module 205 executes one or more computer program products. The computer program products may be tangibly stored in the storage module 265. The storage module 265 may be a hard-disk drive, an optical storage device, a holographic storage device, a micromechanical storage device, a semiconductor storage device, or the like.

Figure 3:
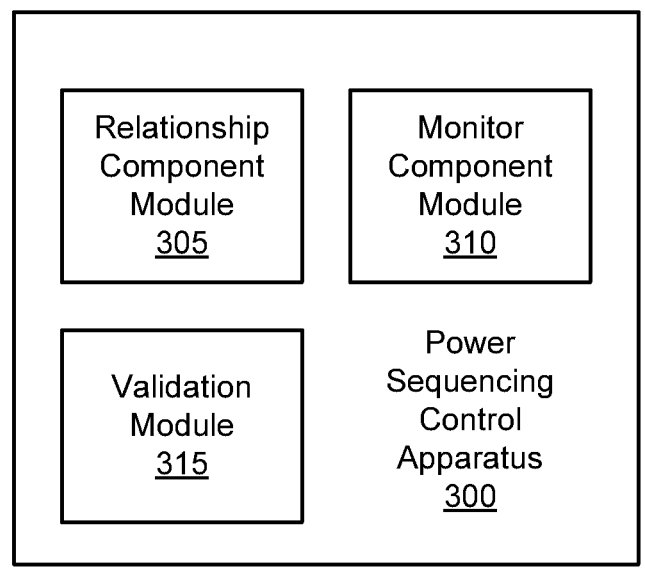
FIG. 3 is a schematic block diagram illustrating one embodiment of a power sequencing control apparatus of the present invention.

FIG. 3 depicts a schematic block diagram illustrating one embodiment of a power sequencing control apparatus 300 of the present invention. The apparatus 300 controls power sequencing and may be embodied in the computer 200 of FIG. 2. The description of apparatus 300 refers to elements of FIGS. 1-2, like numbers referring to like elements. The apparatus 300 includes a relationship component module 305, a monitor component module 310, and a validation module 315. The relationship component module 305, monitor component module 310, and validation module 315 may each be configured as one or more computer program products stored on a storage device such as the storage module 265 and executing on the computer 200.

The relationship component module 305 creates a topology of interdependent relationships of devices in the blade center environment 100. For example, the relationship component module 305 may identify data used by each server blade 105 and each storage blade 115 and the relationship between the blades from that data. Server blades 105 may also be referred to as independent blades and storage blades may be referred to as dependent blades. The topology of interdependent relationships created by relationship component module 305 may identify dependencies of server blades to server blades, and server blades to switch modules, as well as server blades to storage blades.

Furthermore, the relationship component module 305 may establish a hierarchy for each device from VPD to assure that devices are powered off and on in an acceptable sequence. For example, the relationship component module 305 may establish that a first server blade 105a uses information that is stored by a first storage blade 115a. The relationship component module 305 may establish a hierarchy that would require that the server blade 105a be shut down prior to the storage blade 115a.

The monitor component module 310 monitors a command from an AMM 120 to regulate power for devices in the blade center environment 100, wherein the AMM 120 regulates power within the blade center. For example, the monitor component module 310 may monitor a command to power on a third server blade 105c.

The validation module 315 validates that commands do not violate the interdependent relationships between the server blades 105 and the storage blades 115. For example, the validation module 315a command to power down the first storage blade 115a does not violate the interdependent relationship with the first server blade 105a. If the command is not validated, the validation module 315 may block the command.

Figure 4A:
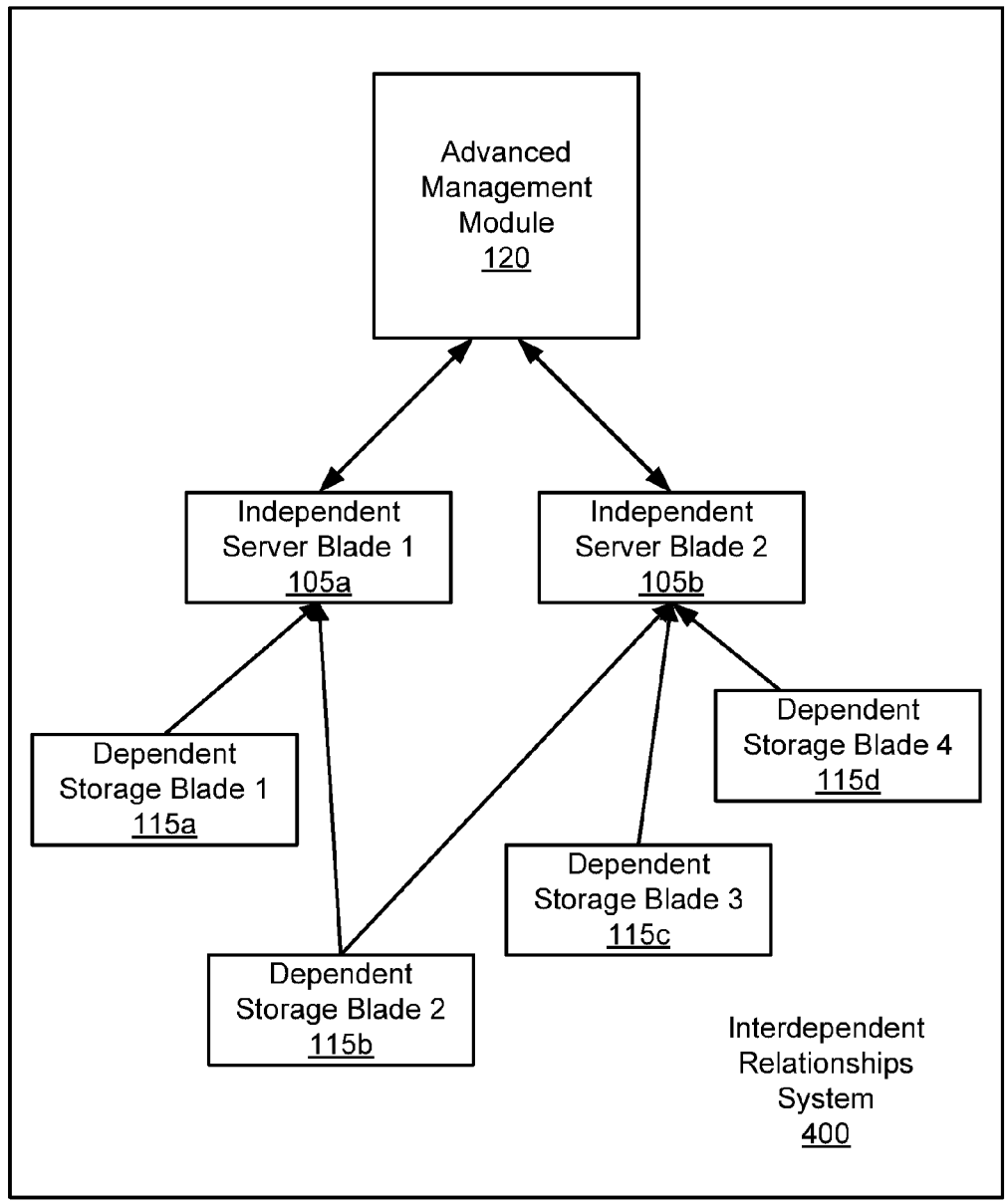
FIG. 4A is a schematic block diagram illustrating one embodiment of an interdependent relationship definition system of the present invention.

FIG. 4A depicts a schematic block diagram illustrating one embodiment of an Interdependent Relationships System 400 of the present invention. The description of the Interdependent Relationships System 400 refers to the elements presented above with respect to the operation of the described Power Sequencing Control Apparatus 300 and the elements of FIGS. 1-3, like number referring to like elements. The Interdependent Relationship Definition System 400 is comprised of an AMM 120, independent server blade 1 105a, and independent server blade 2 105b. Independent server blade 1 105a has an interdependent relationship with dependent storage blade 1 115a and dependent storage blade 2 115b. Independent server blade 2 105b has an interdependent relationship with dependent storage blade 2 115b, dependent storage blade 3 115c, and dependent storage blade 4 115d.

Independent server blades 105 may depend on instructions from dependent storage blades 115. For example, independent server blade 1 105*a* may depend on a disk within dependent storage blade 2 115*b* for operating system instructions. Identifying interdependent relationships of devices assure that the dependent devices 115 and independent devices 105 in the blade center environment 100 are powered off and on in the correct sequence. Although for simplicity, one AMM 120, two independent server blades 105, and four dependent storage blades 115 are shown, any number of AMM 120, independent server blades 105, and dependent storage blades 115 may be employed.

Figure 4B:
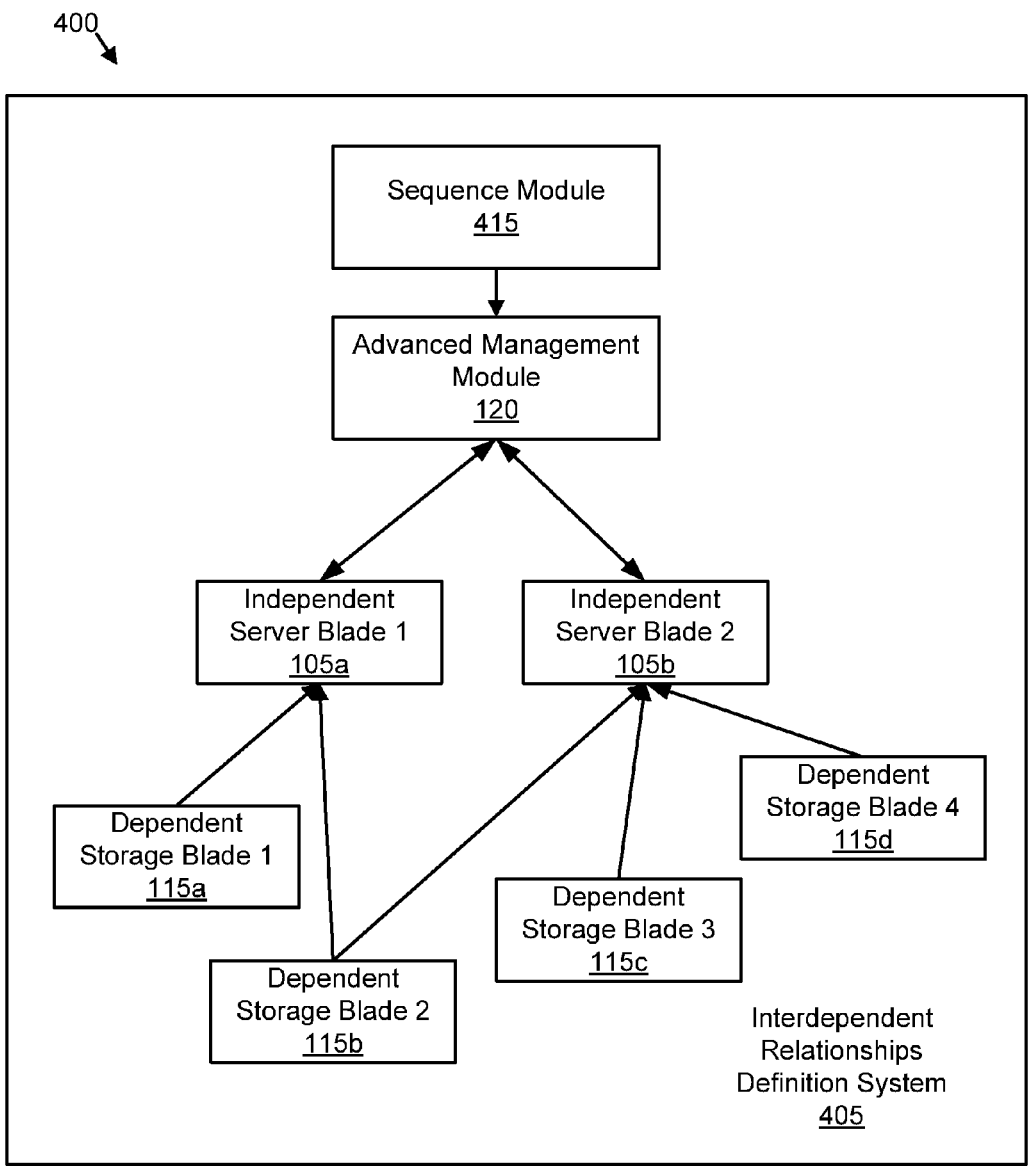
FIG. 4B is a schematic block diagram illustrating one embodiment of a interdependent relationship definition system of the present invention.

FIG. 4B depicts a schematic block diagram illustrating one embodiment of an Interdependent Relationship Definition System 405. The Interdependent Relationship Definition System 405 is comprised of a sequence module 415 that defines the power-off and power-up sequence of the devices, the AMM 120, independent server blade 1 105*a*, and independent server blade 2 105*b*. Independent server blade 1 105*a* has an interdependent relationship with dependent storage blade 1 115*a* and dependent storage blade 2 115*b*. Independent server blade 2 105*b* has an interdependent relationship with dependent storage blade 2 115*b*, dependent storage blade 3 115*c*, and dependent storage blade 4 115*d*.

Independent server blades 105 may depend on instructions from dependent storage blades 115. However, the sequence module 415 may determine that a certain shutdown sequence should be followed. The sequence module 415 may comprise a configuration file stored on a storage device. For example, the sequence module 415 may define that independent server blade 1 105*a* be shut off prior to dependent storage blade 1 115*a*. The sequence module 415 may independently identify interdependent relationships of devices assure that the dependent devices 115 and independent devices 105*b* in the blade center environment 100 are powered off and on in a desired sequence. Although for simplicity, one sequence module 415, one AMM 120, two independent server blades 105, and four dependent storage blades 115 are shown, any number of sequence modules 415, AMM 120, independent server blades 105 and dependent storage blades 115 may be employed.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5A:
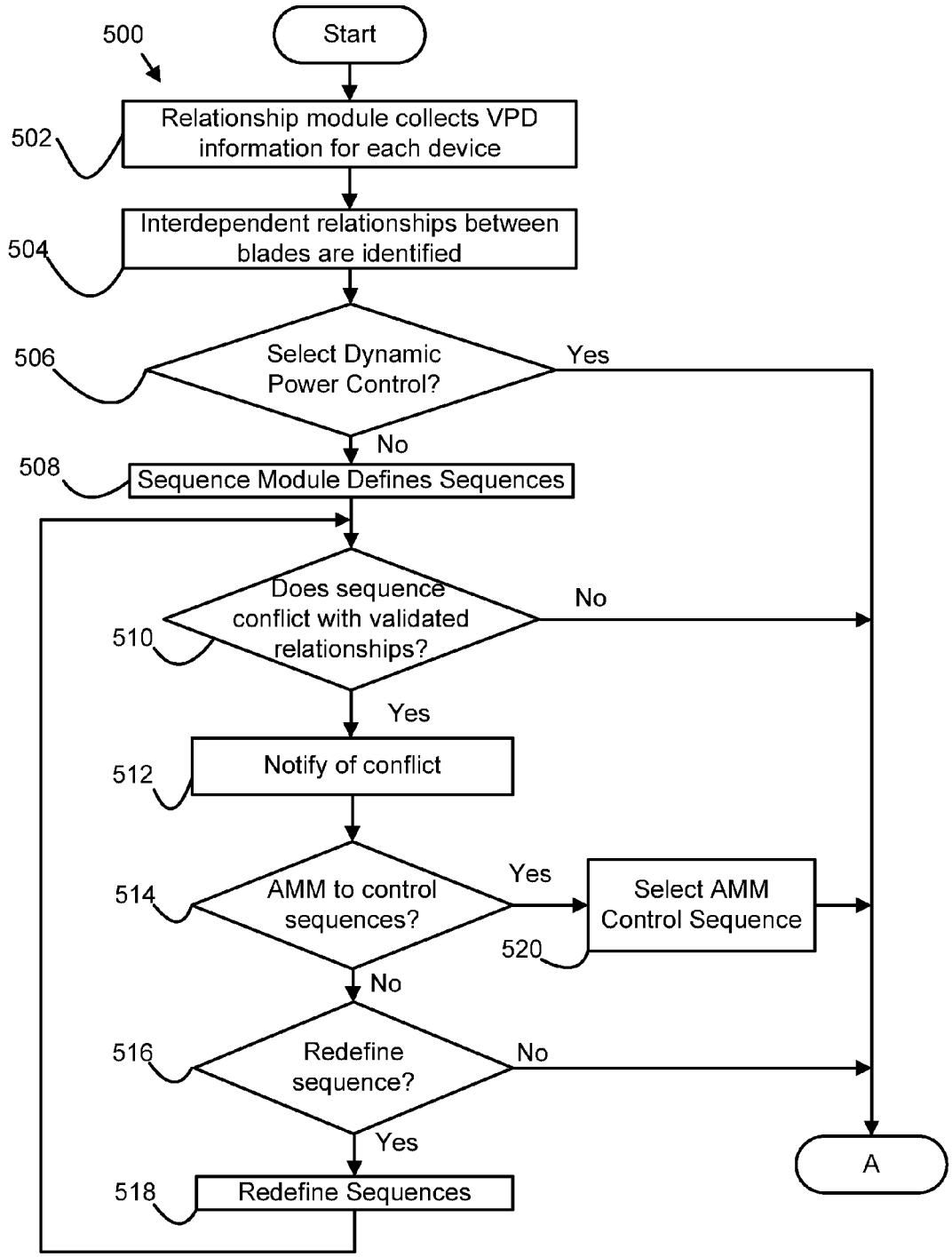
FIGS. 5A, 5B and 5C are a schematic flow chart diagram illustrating one embodiment of a power controlling sequence method of the present invention.
Figure 5B:
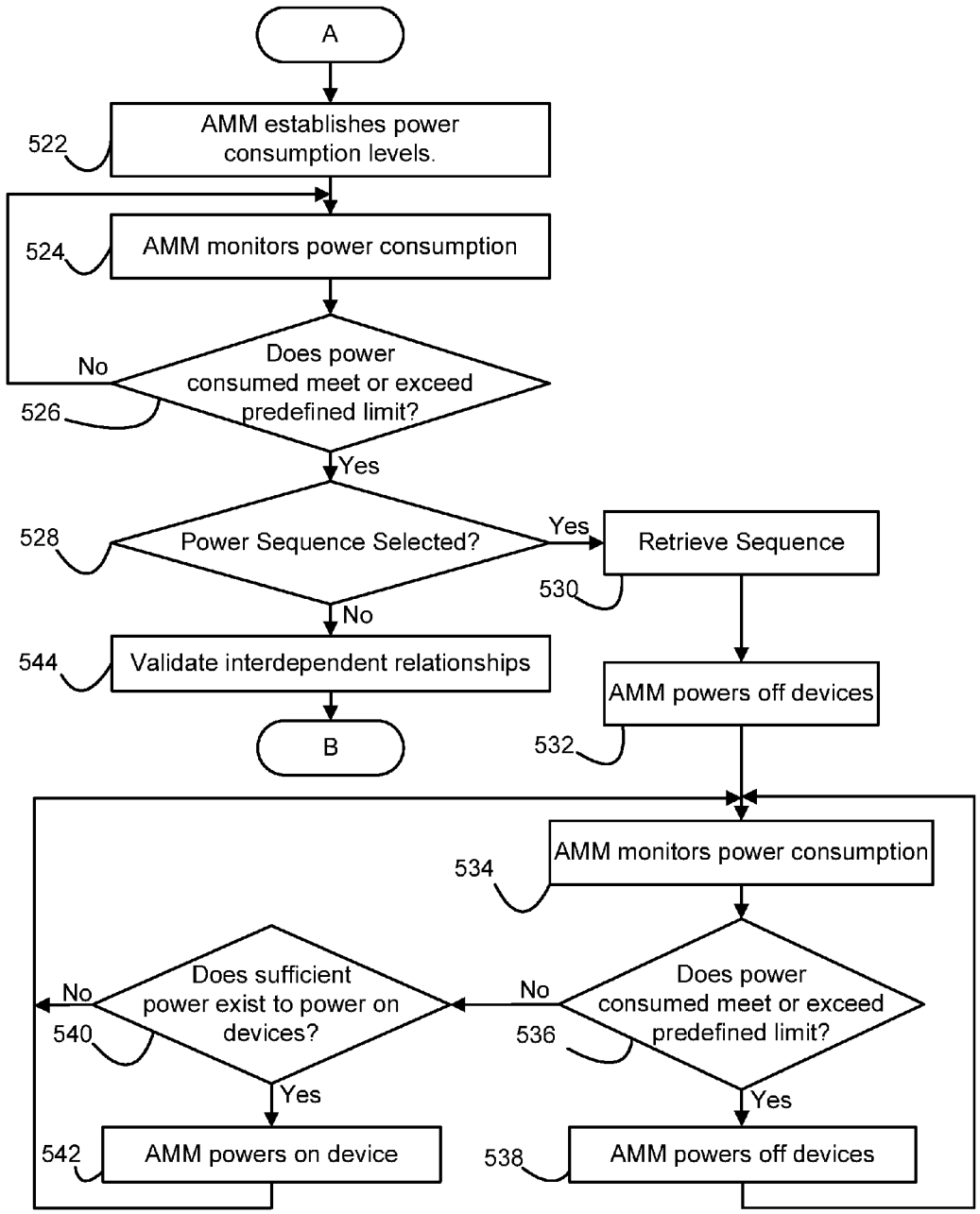
Figure 5C:
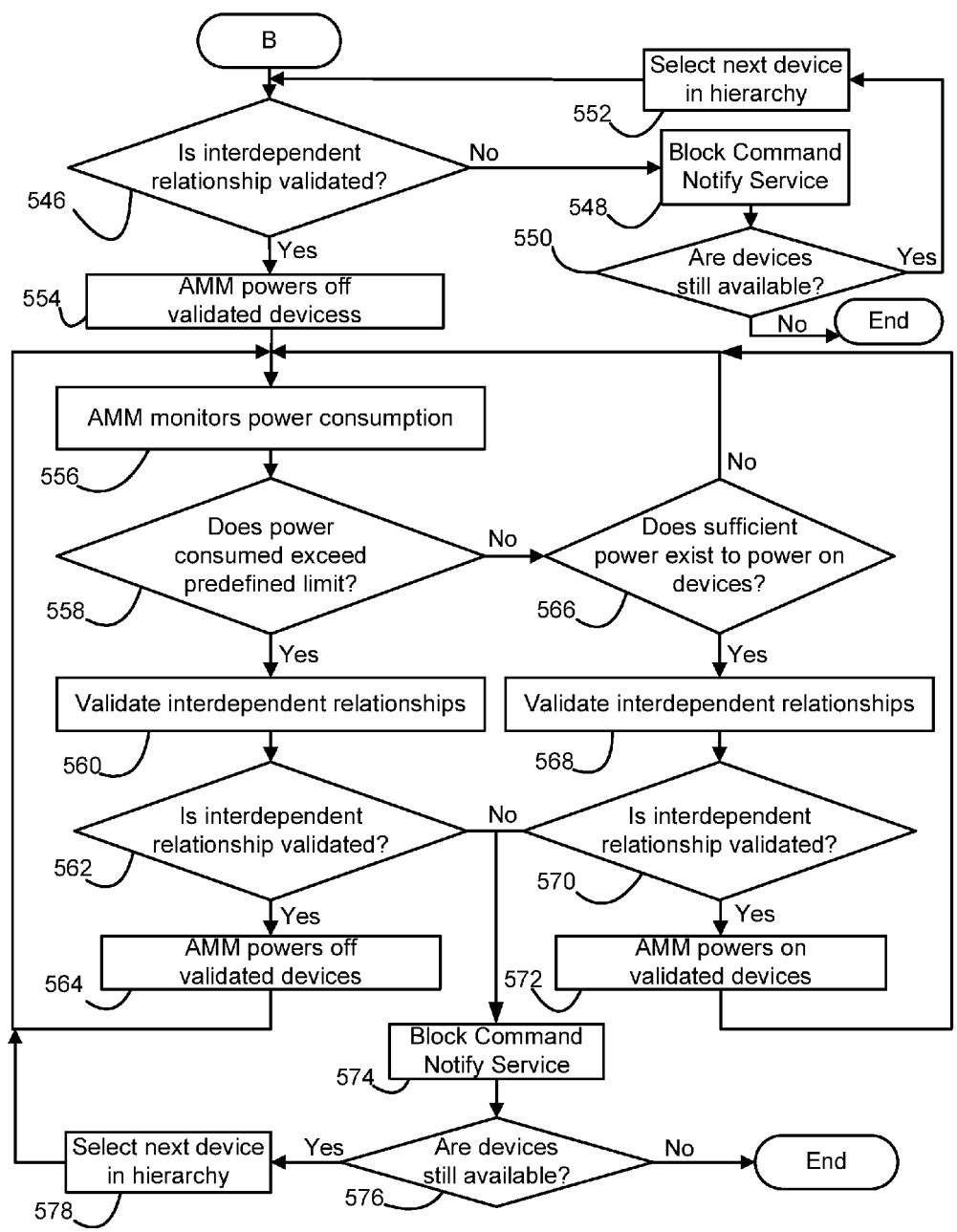

FIGS. 5A, 5B and 5C depict a schematic flow chart diagram illustrating one embodiment of a controlling power sequence method 500. The method 500 substantially includes the steps to carry out the functions presented above with respect to the operation of the interdependent relationship definition system 400, described power sequencing control apparatus 300, and blade center environment 100 of FIGS. 4B, 4A, 3, 2, and 1 respectively. The description of method 500 refers to elements of FIGS. 1-4B, like numbers referring to like elements. In one embodiment, the method 500 is implemented with a computer program product stored on a computer readable medium having a computer readable program. The computer readable program may be executed by the computer 200.

The method 500 begins and in an embodiment the relationship component module 305 collects 502 VPD information for each device of the blade center environment 100. For example, the relationship component module 305 may collect the VPD information of independent server blades 105 and dependent storage blades 115 of the interdependent relationship definition system 400.

The relationship component module 305 identifies 504 interdependent relationships between blades. For example, the relationship component module 305 may determine that independent server blade 1 105*a* has dependent storage blades 1 and 2 115*a-b* providing information.

The relationship component module 305 allows the sequence module 415 to select 506 dynamic power control or defined power control. For example, the sequence module 415 may determine that there is a certain sequence that blades must be powered off.

If the sequence module 415 selects defined power control, the sequence module 415 defines 508 the sequences that the devices will be shut off. For example, the sequence module 415 may select independent server blade 1 105*a* to always be powered off first in the event of the blade center environment 100 consuming too much power. The sequence module 415 may define a complete sequence in which devices may be shut off.

The validation module 315 determines 510 if the defined sequence conflicts with validated relationships. For example, the sequence module 415 may have defined a power down sequence of independent server blade 1 105*a*, dependent storage blade 6 115*a*, and independent server blade 2 105*b*, and the validation module 315 determines 510 that the sequence of interdependent relationships has no conflicts.

If the validation module 315 determines 510 there is a conflict, the validation module 315 notifies 512 the sequence module 415 of conflicts. For example, the validation module 315 may notify the sequence module 415 that dependent storage blades are being powered off before independent server blades.

The validation module 315 queries 514 the sequence module 415 to determine if the sequence module 415 desires the AMM 120 to perform a power-on or power-off sequence. For example, the validation module 315 may inform the sequence module 415 that a defined power-off sequence of dependent blades 115 and independent blades 105 violates established parameters and indicate that the AMM 120 should be blocked in performing the power-off sequence.

The sequence module 415 may also select 520 that AMM 120 be allowed to perform the power-off sequence of the blades in the blade center environment 100. For example, the sequence module 415 may select 520 that the AMM 120 be allowed to perform the power-off sequence if no interdependent relationships will be violated.

The relationship component module 305 queries 516 the sequence module 415 to determine whether to redefine the sequence to power-off blades in the blade center environment 100. For example, the sequence module 415 may determine that the VPD requires a sequence to power-off dependent storage blades 105 prior to independent server blades 115 and so should not redefine the sequence.

In another embodiment, the sequence module 415 redefine 518 the sequence. For example, the sequence module 415 may determine that the defined sequence 508 was not correct and thus redefines 518 the power-off sequence to better meet the validation sequence criteria. The method continues and the validation module 315 validates the sequence relationship 510.

Continuing the method 500 with FIG. 5B, the AMM 120 establishes 522 power consumption levels for the blade center environment 100. For example, the blade center environment 100 may be attached to a circuit breaker panel that will only allow thirty kilowatts (30 kw) of power so the AMM 120 establishes 522 a consumption level of twenty eight point zero kilowatts (28.0 kw). Controlling the power may prevent a catastrophic failure due to a power related shut down.

The AMM 120 monitors 524 power consumption. For example, the AMM 120 may monitor 524 the aggregate power consumption from the server blades 105 and storage blades 115 and switch modules 110 in blade center environment 100 to assure that total consumption does not exceed the defined limits.

In one embodiment, the monitoring component module 310 may determine 526 if power consumed in the blade center environment 100 meets or exceeds predefined limits. For example, the blade center environment 100 may be consuming twenty seven point three kilowatts (27.3 kW) of electricity. If the monitoring component module 310 determines 526 the power consumed does not exceed the predefined limit, the AMM 120 continues to monitor 524 power consumption.

In another embodiment, the monitoring component module 310 may determine 526 if the power consumed exceeds predefined limits. For example, the AMM 120 may determine that the power consumption is twenty nine point two kilowatts (29.2 kw) and exceeds the predefined limit of twenty eight point zero kilowatts (28.0 kw).

If the monitoring component module 310 determines 526 that the power consumed exceeds the predefined limits, the relationship component module 305 determines 528 if the defined power sequence 528 is selected. For example, the relationship component module 305 may determine that the sequence module 415 defined power sequence controls the power sequencing of the blades.

If the defined power sequence is selected 528, the relationship component module 305 retrieves 530 the defined power sequence. For example, the relationship component module 305 may store the most recently defined sequence and retrieve 530 the sequence, when required by the sequence module 415, due to power requirements. If the defined power sequence is not selected 528, the validation module 315 validates 544 interdependent relationships the hierarchy.

The AMM 120 powers off 532 the devices according to the sequence module defined power sequence. For example, the AMM may power off independent server blade 1 115a as defined by the sequence module 415.

The AMM 120 continues to monitor 534 power consumption. The AMM 120 may determine 536 that power consumed exceeds the predefined limit. For example, the twenty-eight point five kilowatts (28.5 kW) that the blade center environment is consuming is above the predefined limit of twenty-eight point zero kilowatts (28.0 kw).

The AMM 120 powers off 538 the devices according to the sequence module 415 defined sequence 508. For example, the AMM may power off dependent storage blade 1 115a as defined by the sequence module 415. The AMM 120 continues to monitor 534 power consumption.

If the monitoring component module 310 determines 536 that power consumed does not exceed the predefined limit, the monitoring component module 310 may determine 540 whether there is sufficient power to power up a device. For example, the monitoring component module 310 may determine that the only blade available requires two point seven kilowatts (2.7 kw) of power which exceeds the predefined limit of twenty-eight point zero kilowatts (28.0 kw) and so the AMM 120 continues to monitor 534 power consumption.

In another embodiment, the monitoring component module 310 may determine 540 that a powered off independent blade 105 in the blade center environment 100 will only consume one point three kilowatts (1.3 kw) which, when added to the other power being consumed, is less than the predefined limit of twenty-eight point zero kilowatts (28.0 kw). The AMM 120 powers on 542 the device and the AMM 120 continues to monitor 534 power consumption.

Continuing the method 500 with FIG. 5C, the AMM120 manages the blade center environment 100 in dynamic power control mode. In an embodiment, the validation module 315 determines 546 if interdependent relationships are validated. For example, the validation module 315 may identify an invalid interdependent relationship between independent server blade 1 105a and dependent storage blade 3 115c.

If the validation module 315 determines 546 that an interdependent relationship is not valid, the validation module 315 blocks 548 the AMM command from powering off the device and notifies 548 the provider's service department. For example, the validation module 315, may notify a provider's service department that there is an invalidated relationship model that requires service.

The AMM 120 determines 550 if there are other devices in the blade center environment 110 that can be powered off. For example, the AMM 120 may determine that dependent storage blade 6 115f and dependent storage blade 7 115g can be powered off.

The AMM 120 selects 552 the next device in the established hierarchy. For example, the blade center environment 100 may still be consuming power above the predefined limit and the AMM 120 selects dependent storage blade 7 115g to power off. If the AMM 120 determines there are not other candidate devices in the blade center environment 100, the method 500 ends.

If the validation module 315 determines 546 that the interdependent relationships are valid, then the AMM 120 powers off 554 validated devices. For example, the AMM 120 may power off independent server blade 1 105a first because the validation module 315 validated the interdependent relationships definition system 400 in that the dependent storage blade 1 115a needed information from independent server blade 1 105a and could not be shut off before the independent server blade.

The AMM 120 continues to monitor 556 power consumption. For example, the AMM 120 may monitor the blade center environment 100 to determine if power capacity has changed.

The monitoring component module 310 determines 558 if power consumed in the blade center environment 100 exceeds a predefined limit. For example, the blade center environment 100 may be consuming twenty seven point four kilowatts (27.4 kW) of electricity and not exceed the predefined limit of twenty eight point zero kilowatts (28.0 kW).

If the power consumed does not exceed the predefined limit, the AMM 120 determines 566 if there is sufficient power to power on a device in the blade center environment 100. For example, the independent server blade 5 105e may use two point two kilowatts (2.2 kW) of power and the combined power of the blade center environment 100 is twenty nine point six kilowatts (29.6 kW) which exceeds the predefined limit. If there is not sufficient power, the AMM 120 continues to monitor 556, power consumption.

The AMM 120 may determine 566 that there is sufficient capacity to power on a device in the blade center environment 100. For example, the power being consumed in the blade center environment 100 may be twenty five point five kilowatts (25.5 kW) of power and the combined consumption with the addition of independent server blade 5 105e may be twenty seven point seven kilowatts (27.7 kW).

If the monitoring component module 310 determines 566 sufficient power exists to power on blades, the validation module 315 validates 568 the interdependent relationships. For example, the validation module 315 may review and validate interdependent relationships for powering devices off and on.

The validation module 315 determines 570 if the interdependent relationships are validated. For example, the validation module 315 may determine 570 that there are no sequence conflicts between the independent server blade 2 105b and the dependent storage blade 5 115e.

The AMM 120 powers on 572 the validated device. For example, the independent server blade 2 105b may be powered on because sufficient capacity exists and because the interdependent relationships of the independent server blade 2 105b are validated. The AMM 120 continues to monitor power consumption 556.

If the validation module 315 determines the interdependent relationship 570 is not validated, the validation module blocks 574 the AMM command from powering off the device and notifies 574 the provider's service department. For example, the validation module 315 may notify 574 a provider's service department that a customer has an invalidated relationship model and requires service.

The AMM 120 determines 576 if there are other devices in the blade center environment 100 that can be powered on. For example, the AMM 120 may determine that dependent storage blade 8 115h and dependent storage blade 9 115i can be powered on.

If the AMM determines 576 that other devices can be powered on, the AMM 120 selects 578, the next device in the established hierarchy. For example, the blade center environment 100 may still be consuming power above the predefined limit and the AMM 120 selects dependent storage blade 9 115i to power on. The AMM 120 monitors 556, power consumption.

If the AMM 120 determines there are not other devices in the blade center environment 100 to power on, the method 500 ends.

If the monitoring component module 310 determines 558 the power consumed in the blade center environment 100 exceeds predefined limits, the validation module 315 validates 560 interdependent relationships. For example, if the blade center environment 100 consumes twenty eights point five kilowatts (28.5 kW) of electricity, exceeding the predefined limit of twenty eight point zero kilowatts (28.0 kW), the validation module 315 may review and validate interdependent relationships for powering devices off and on.

The validation module 315 determines 562 if the interdependent relationships are validated. For example, the validation module 315 may determine that there are no sequence conflicts between the independent server blade 2 105b and the dependent storage blade 3 115c.

If the validation module 315 determines 562 there the interdependent relationships are validated, the AMM 120 powers off 564 a validated device. For example, the AMM120 may power off independent server blade 2 105b. The AMM 120 continues to monitor 556, power consumption.

If the validation module 315 determines 562 that the interdependent relationships are invalid, the validation module 315 blocks 574 the AMM command from powering off the device and notifies 574 the provider's service department. For example, the validation module 315, may notify 574 a provider's service department that a customer has an invalidated relationship model and requires service.

The AMM 120 determines 576 if there are other devices in the blade center environment 100 that can be powered off. For example, the AMM 120 may determine that dependent storage blade 8 115h and dependent storage blade 9 115i can be powered off.

The AMM 120 selects 578, the next device in the established hierarchy. For example, the blade center environment 100 may still be consuming power above the predefined limit and the AMM 120 selects dependent storage blade 9 115i to power off. The AMM 120 monitors 554, power consumption. If the AMM 120 determines 576 there are not other devices in the blade center environment 100, the method 500 ends.

Figure 6A:
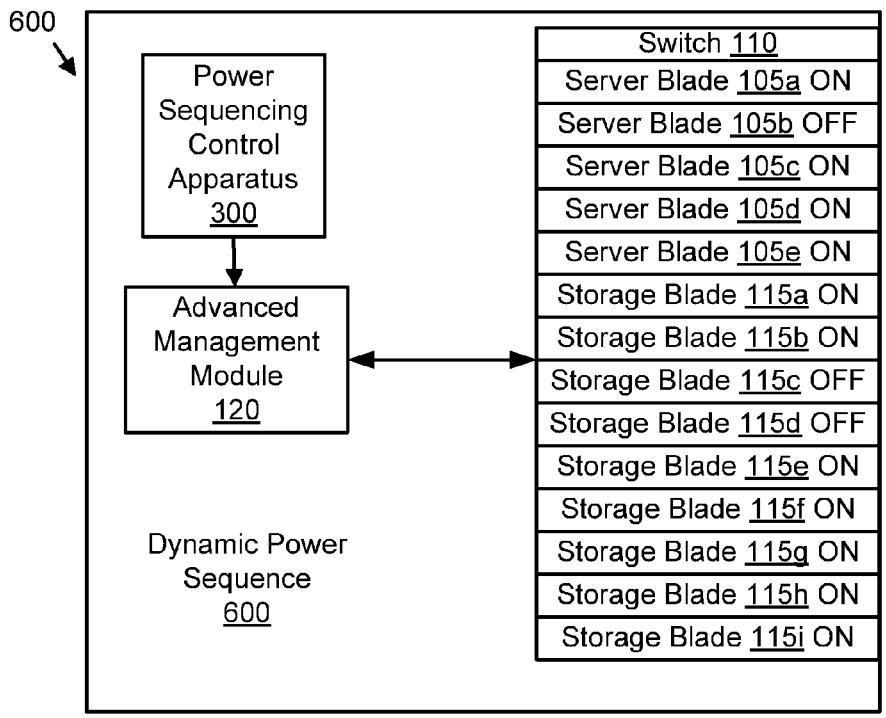
FIG. 6A is a schematic block diagram illustrating one embodiment of a dynamic power sequence method of the present invention.

FIG. 6A depicts a schematic block diagram illustrating one embodiment of a Dynamic Power Sequence 605 of the present invention. The description of the Dynamic Power Sequence 605 refers to the elements presented above with respect to the operation of the described controlling power sequence method 500, interdependent relationship definition system 400, described power sequencing control apparatus 300, computer 200 and blade center environment 100 of FIGS. 5C, 5B, 5A, 4B, 4A, 3, 2, and 1 respectively. The Dynamic Power Sequence 605 is comprised of a blade center environment 100 including 5 server blades 105a, 105b, 105c, 105d, and 105e; 9 storage blades 115a, 115b, 115c, 115d, 115e, 115f, 115g, 115h, and 115i; a switch module 110; an AMM 120; and a power sequencing control apparatus 300.

Although for simplicity, one power sequencing control apparatus 300, one AMM 120, five server blades 105, nine storage blades 115, and one switch module 110 are shown, any number of AMM 120, server blades 105, storage blades 115 and switch modules may be employed.

The power sequencing control apparatus 300 provides information to the AMM 120 to control decisions from AMM 120. For example, the power sequencing control apparatus 300 may provide updated information regarding validated relationships between server blades 105 and storage blades 155.

The AMM 120 powers off storage blades 115 and server blades 105 and switch module 110. For example, the AMM 120 may select the sequence to power off the storage blade 3 115c, storage blade 4 115d, independent server blade 2 105b and switch module 110.

The progression of powering off devices follows the sequences established by the relationship component module 305 and validated by the validation module 315, the sequence conforming to the interdependent relationships definition system 400. The validation module 315 uses the established hierarchy to prevent blades from powering off.

Figure 6B:
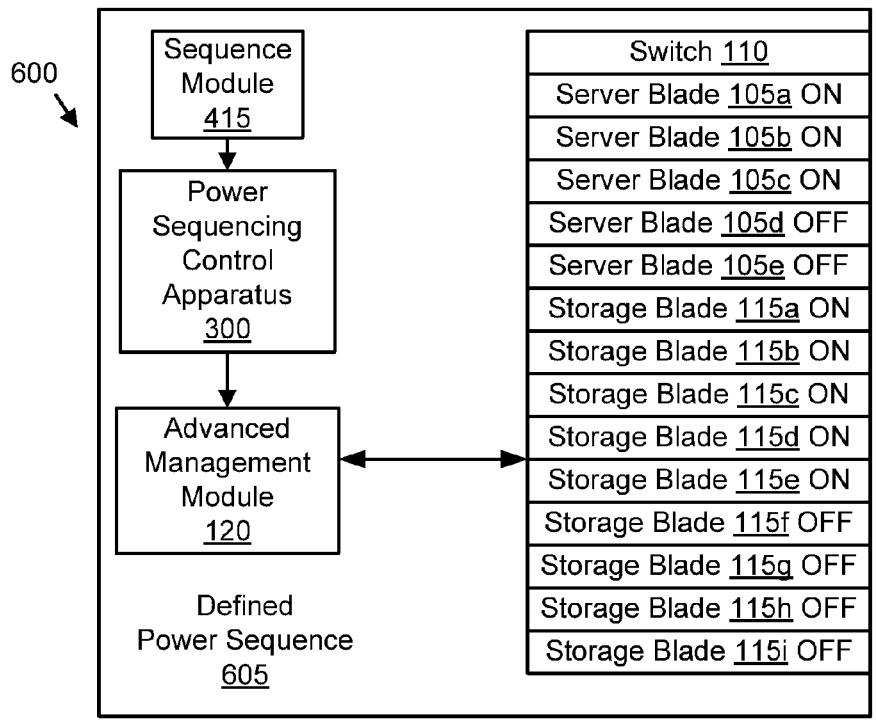
FIG. 6B is a schematic block diagram illustrating one embodiment of a defined power sequence method of the present invention.

FIG. 6B depicts a schematic block diagram illustrating one embodiment of a Defined Power Sequence 605 of the present invention. The description of the Defined Power Sequence 605 refers to the elements presented above with respect to the operation of the described controlling power sequence method 500, interdependent relationship definition system 405, described power sequencing control apparatus 300, computer 200 and blade center environment 100 of FIGS. 5C, 5B, 5A, 4B, 4A, 3, 2, and 1 respectively. The Defined Power Sequence 605 is comprised of a blade center environment 100 including 5 server blades 105a, 105b, 105c, 105d, and 105e; 9 storage blades 115a, 115b, 115c, 115d, 115e, 115f, 115g, 115*h*, and 115*i*; a switch module 110; and AMM 120; a power sequencing control apparatus 300 and an sequence module 415.

Although for simplicity, one sequence module 415, one power sequencing control apparatus 300; one AMM 120, five server blades 105, nine storage blades 115, and one switch module 110 are shown, any number of sequence modules 415, power sequencing control apparatus 300, AMM 120, server blades 105, storage blades 115 and switch modules may be employed.

The sequence module 415 defines the sequence and then the power control sequencing apparatus 300 communicates the sequence to the AMM 120 which powers off storage blade 115*f*, storage blade 115*g*, storage blade 115*h*, and 115*i*, and server blade 105*d*, and 105*e* and switch module 110. The sequence conforms to the interdependent relationship definition system 405. For example, the sequence module 415 may select the sequence and use AMM 120 to power off the storage blade 6 115*f*, storage blade 7 115*g*, storage blade 8 115*h*, storage blade 9 115*i*, server blade 4 105*d*, server blade 5 105*e*, and switch module 110 in sequence.

The progression of powering off devices follows the sequences established by the sequence module 415 and which may or may not validated by the validation module 315, the sequence conforming to the interdependent relationships definition system 405. The validation module 315 uses the established hierarchy to prevent blades from powering off unless overridden by the sequence module 415.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to control power sequencing in a blade center environment, the comprising:

creating a topology of interdependent relationships of devices in the blade center environment, the devices comprising server blades, storage blades, and switch modules;

defining a sequence of the devices in the blade center environment to power off and on based on the topology of interdependent relationships, the sequence comprising an order of a first independent blade server, each dependent storage blade of the first independent blade server, and a second independent blade server;

monitoring a command from an Advanced Management Module (AMM) to regulate power for devices in the blade center environment, wherein the AMM regulates power within the blade center; and validating that the command does not violate the interdependent relationships and the sequence of devices else block the command if the command is not validated.

2. The method of claim 1, wherein the interdependent relationships of the blade center environment are defined by vital product data.

3. The method of claim 1, further comprising establishing hierarchies of vital product data for each device to assure the sequence of devices is acceptable.

4. The method of claim 1, further comprising identifying interdependent relationships of devices to assure that the dependent devices and independent devices in the blade center environment are powered off and on in the sequence of devices.

5. The method of claim 4, wherein the interdependent relationships for controlling power to the devices are modified by the sequence module.

6. The method of claim 5, further comprising validating that the interdependent relationships for powering devices off and on meet predefined criteria.

7. The method of claim 1, wherein the AMM establishes predefined limits for power consumption.

8. The method of claim 7, wherein the AMM monitors the combined power consumption of each device to determine if total consumption exceeds the predefined limits.

9. The method of claim 8, further comprising validating that the interdependent relationships for powering devices off and on meet predefined criteria.

10. The method of claim 8, further comprising validating that the interdependent relationships for powering devices off and on meet predefined criteria prior to allowing the AMM to control power of the devices.

11. The method of claim 10, the method further comprising:

preventing the AMM from powering off AMM sequenced devices if the interdependent relationship is not validated;

selecting the next device in the sequence of devices; and notifying the provider's service department of the unvalidated relationship.

12. The method of claim 1, further comprising sending notification when power consumption levels require powering off a device.

* * * * *